Oct. 27, 1936.   R. A. SCHATZEL   2,059,178
ELECTRIC CABLE
Filed June 7, 1934
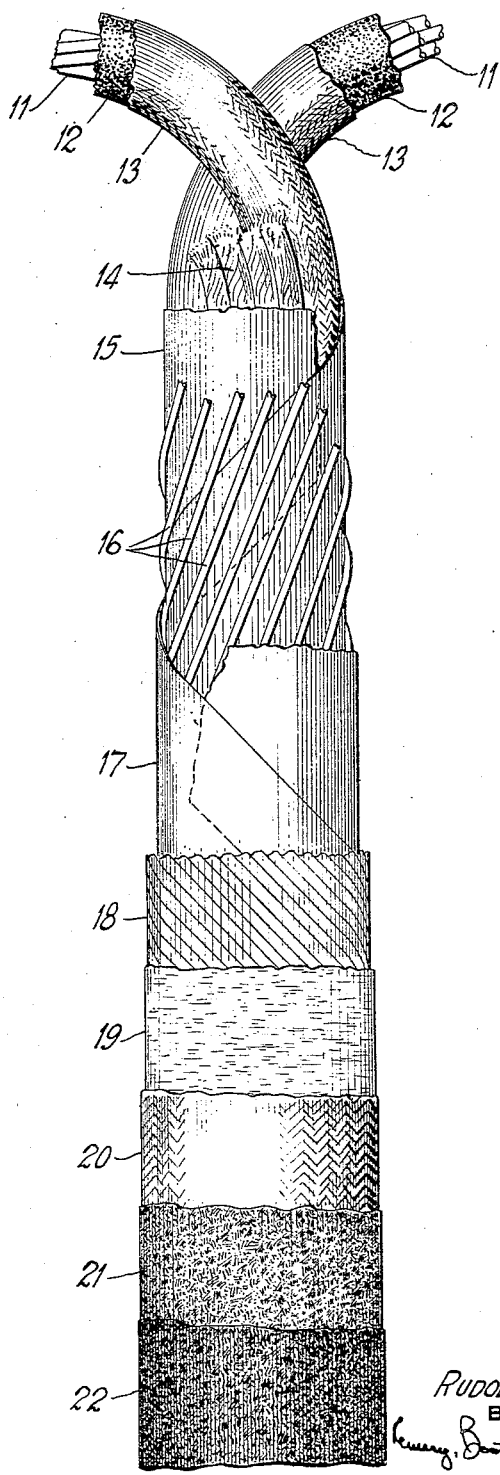
INVENTOR
RUDOLPH A. SCHATZEL
BY
ATTORNEYS Patented Oct. 27, 1936

2,059,178

UNITED STATES PATENT OFFICE 2,059,178

ELECTRIC CABLE

Rudolph A. Schatzel, Rome, N. Y., assignor to General Cable Corporation, New York, N. Y., a corporation of New Jersey Application June 7, 1934, Serial No. 729,419

12 Claims. (Cl. 173—264)

This invention relates to insulated electric conductors, and more particularly to non-metallic sheathed cables in which secret unauthorized diversion of electric current is made hazardous and practically impossible. It is an object of the invention to provide an improved cable construction. Other objects and advantages of the invention will appear hereinafter.

The invention will be best understood from the following description when read in the light of the accompanying drawing illustrating a specific embodiment of the invention. In the drawing the single figure shows, to somewhat enlarged scale, an elevation of a short length of cable, the various elements comprising the cable being cut away progressively greater distances to disclose the construction more clearly.

The use of non-metallic sheathed cable for distributing electric power has facilitated the unauthorized diversion or theft of current. This is particularly true where the connection between the distribution system and the local circuit of a consumer is made by means of a non-metallic sheathed cable. In such cases it has been a relatively simple matter to force slender, pointed conducting members, for example pins, nails or knife blades, through the cable insulation into the cable conductors ahead of the electric meter so as to draw current from the line which is not registered on the consumer's meter.

These pointed members are readily inserted and withdrawn in a few seconds' time, and the small openings which are left in the conductor coverings are difficult to discover. Such openings ordinarily are not noticed by the person reading the electric meter, and may even escape discovery upon a close inspection.

According to the present invention a non-metallic sheathed cable is provided in which the unauthorized diversion of current by merely forcing pins or similar members through the insulation into the cable conductors is made impossible, and in which any theft of current is made extremely hazardous and difficult. In the cable of the present invention, any connection to the conductors for diverting current would necessitate such mutilation, or result in such damage to the cable covering that the tampering with the cable would be readily apparent, if service were not actually interrupted.

Referring to the drawing which shows an illustrative embodiment of the invention, there are two conductors 11, each having an insulating covering 12, for example a layer of rubber compound. In the illustrative embodiment each insulated conductor has a protective jacket 13, for example a cotton braid which may be saturated with paraffine or other suitable material. Conveniently the cotton braids 13 may be of different colors to facilitate the making of the circuit connections.

The two insulated and jacketed conductors are laid up together, for example by twisting, and the valley spaces between the conductors desirably are filled out to give the desired overall shape to the cable. In the illustrative embodiment the valley fillers 14 comprise saturated jute cords which give an overall round shape to the cable.

Surrounding the assembled conductors and filler material there desirably is a thin conducting layer 15, conveniently a helical wrapping of non-metallic conducting tape. This semi-conducting tape may take the form of a rubberized cloth tape treated with a graphite containing compound, for example, a graphite base rubber cement mixture. Or, the tape might be treated with a casein and lamp black mixture. The tape desirably is applied with edges of adjacent turns overlapping so that a continuous conducting layer is provided around the insulated conductors.

Over the conducting layer 15 there is a serving of helically applied conductors 16, for example tinned copper wires. Desirably the total cross section of the wires 16 is approximately equal to the cross section of one of the conductors 11, so that the wires 16 may serve as one of the conductors in a three conductor cable. Desirably the conductors 16 are spaced from each other circumferentially of the cable, thereby keeping down the cost and weight of the cable. Such a construction also permits the desired conductor cross section without loss of flexibility and without resorting to extremely fine wires which would be difficult to apply and subject to breakage.

Over the layer of conductors 16 there desirably is a second thin layer 17. Desirably this layer 17 is similar to the layer 15. It will be apparent from the description thus far that each of the conductors 11 is surrounded by a conducting layer comprising the semi-conducting tapes 15 and 17 and the layer of wires 16. The wires 16 comprise one of the cable conductors, and while they do not by themselves constitute a continuous conducting covering, these wires are in electrical contact with the semi-conducting layers 15 and 17.

In the construction thus far described, any slender, pointed conducting members forced into the cable and into the conductors 11 necessarily pass through the conducting layer 15—16—17, and would establish a short circuit between the conductor 11 with which contact is made and the surrounding conducting layer. If the slender conducting member which is pushed into the cable makes direct contact with one of the conductors 16, the resulting short circuit probably would fuse the inserted member instantly, with damage to the cable sheath which would be readily apparent. If the pin did not actually touch one of the conductors 16, the short circuit completed to these conductors by means of the semi-conducting tapes 15 and 17 would rapidly result in a fusing of the inserted member, or destruction of the cable at that point.

The layers 15 and 17 serve not only to prevent theft of current, but also to keep the wires 16 clean, thereby facilitating the making of soldered connections. If one of the layers 15 and 17 is conducting, and the other of these layers is employed merely to keep the wires clean, this other layer need not be a conductor, but might be merely a cloth or paper wrapping.

To make more difficult the insertion of any slender conducting member to the cable insulation, there desirably is applied over the conducting layer 17 a tough, abrasion-resistant non-metallic armor 18. In the illustrative embodiment this armor comprises a layer of helical paper cords which have been treated with casein and impregnated with a varnish, for example a "Bakelite" compound, which is baked. Conveniently, these cords may be applied prior to baking of the impregnating compound, in which case the desired baking may be accomplished by the heat of the saturant applied to the outer protective covering, hereinafter described. The layer of paper cords 18 provides a tough, abrasion resistant armor, which nevertheless is flexible.

Over the non-metallic armor 18 there desirably is a thin sealing layer 19 to prevent penetration into the paper cord layer of the saturant applied to the overlying braid. Conveniently this sealing layer or dam may take the form of an overlapping wrap of crepe paper which effectively prevents penetration to the layer 18 of the saturating compound with which the overlying jacket is treated.

The outer jacket 20 conveniently is a fibrous braid, for example a hawser cord braid. Desirably this braid 20 is saturated and filled with a suitable moisture proofing material, for example a pitch compound, as indicated at 21. Such a pitch coating will be applied hot, and the heat from this coating compound may be relied upon to bake the varnish with which the layer 17 is saturated. Over the coating 21 desirably is applied a finish coating 22, comprising, for example, mica and size to provide a smooth, non-sticky finish.

In the cable of the illustrative embodiment the outer protective armor 18 and the jacket 20 provide a tough flexible sheath which is highly resistant to abrasion and highly resistant to the insertion of any pin or other slender pointed conductor to the interior of the cable. The layer 18 of saturated paper cords is particularly effective to prevent insertion of any slender conducting members.

If the conducting members are successfully inserted through the cable sheath and then pushed into the cable conductors 11 they necessarily pass through the conducting layer 15—16—17, establishing a short circuit which promptly fuses the short circuiting member and results in a destruction of the cable at that point. Thus any attempt to divert current from the cable in an unauthorized manner will immediately be made apparent.

The thin conducting layer 15 or 17 which is used in conjunction with the layer 16 of wires might be in the form of a thin metal tape or foil, or the composite layer 15—16—17 of the illustrative embodiment might be replaced by an overlapping wrap of metal conducting tape. Ordinarily, however, it is preferable to use one or two of the non-metallic or semi-conducting tape layers in combination with a layer of helical wires.

The non-metallic conducting tape has an appearance similar to insulating tapes in common usage. Any one desiring to secretly divert current from the cable conceivably might insert conducting pins through the cable sheath and between the spaced conductors 16, but probably never would realize that the layers 15 and 17 also were sufficiently conducting to provide a short circuit. To avoid a short circuit with these layers would require a relatively large opening in the cable sheath.

In some cases it might be desirable to saturate the valley fillers 14 with a compound containing a conducting material such as graphite or lamp black to make the valley fillers semi-conducting. This would increase the difficulty of making a secret unauthorized connection. Also in some cases it might be desirable to individually surround the insulated conductors 11 with a semi-conducting jacket. In the latter case this semi-conducting jacket might take the form of an overlapping wrapping of fibrous tape suitably impregnated with a conducting compound, this tape being applied over the conductor insulation 12 and under the protective braid 13.

I have provided an improved cable in which the secret unauthorized diversion of current is made too hazardous to be effected by any except those with exceptional skill. To the latter no cable is theft-proof. Any diversion of current by forcing slender, pointed conducting members through the cable sheath into the conductors will result promptly in a short circuit which either will destroy the cable or so damage the cable that the tampering therewith will be immediately apparent to anyone inspecting the cable.

It will be understood that the invention may be variously modified and embodied within the scope of the subjoined claims.

I claim:

1. An article of manufacture comprising, in combination, an electric conductor, an insulating wall enclosing the conductor, a surrounding conducting layer comprising a thin layer of non-metallic conducting material and a layer of wires, said wires serving as a second conductor, and an overlying sheath.

2. An article of manufacture comprising, in combination, an electric conductor, an insulating wall enclosing the conductor, a surrounding conducting layer comprising a thin layer of non-metallic conducting material and a layer of helically arranged, spaced wires all of which extend in the same helical direction, and an overlying non-metallic sheath.

3. An article of manufacture comprising, in combination, an electric conductor, an insulating wall enclosing the conductor, a thin conducting layer completely enclosing the insulated conductor, an overlying layer of wires, another thin conducting layer over the wires, each of said thin conducting layers contacting with said wires, and an overlying non-metallic sheath.

4. An article of manufacture comprising, in combination, an electric conductor, an insulating wall enclosing the conductor, an overlapping wrapping of semi-conducting tape surrounding the insulated conductor, an overlying layer of helically arranged wires all of which extend in the same helical direction, and an outer non-metallic sheath.

5. An article of manufacture comprising, in combination, an electric conductor, an insulating wall enclosing the conductor, a layer of helically arranged wires surrounding the insulated conductor, an overlying wrapping of semi-conducting tape, and an outer non-metallic sheath.

6. An article of manufacture comprising, in combination, a plurality of insulated conductors cabled together, a surrounding conducting layer comprising an overlapping wrapping of thin conducting tape and a layer of helically arranged wires, and an outer non-metallic sheath.

7. An article of manufacture comprising, in combination, a plurality of insulated conductors cabled together, filler material in the valleys between the conductors, a surrounding conducting layer comprising an overlapping wrapping of semi-conducting tape and a layer of helically arranged, spaced wires, and an outer non-metallic sheath.

8. An article of manufacture comprising, in combination, a plurality of insulated conductors cabled together, filler material in the valleys between the conductors, an overlapping wrapping of non-metallic conducting tape surrounding the insulated conductors and the filler material, an overlying layer of spaced wires, another wrapping of non-metallic conducting tape over the wires, and a surrounding non-metallic sheath highly resistant to abrasion.

9. An article of manufacture comprising, in combination, a plurality of insulated conductors cabled together, semi-conducting filler material in the valleys between the conductors, a surrounding conducting layer comprising an overlapping wrapping of thin conducting tape and a layer of helically arranged wires, and an outer non-metallic sheath.

10. An article of manufacture comprising, in combination, a plurality of insulated conductors cabled together, a surrounding conducting layer comprising an overlapping wrapping of thin conducting tape, an overlying layer of helically arranged wires, a tape wrapping having its adjacent edges overlapping, and an outer non-metallic sheath.

11. An article of manufacture comprising, in combination, a plurality of insulated conductors cabled together, an overlapping tape wrapping surrounding the insulated conductors, an overlying layer of wires, another wrapping of tape over the wires, at least one of said tape wrappings being conductive, and a surrounding non-metallic sheath.

12. A theft proof electric cable comprising, in combination, two insulated conductors, a neutral conductor surrounding the two insulated conductors, said neutral conductor comprising a continuous thin layer of non-metallic conducting material and a layer of circumferentially spaced wires, and an enclosing non-metallic sheath.

RUDOLPH A. SCHATZEL.